United States Patent
Hardie et al.

(10) Patent No.: US 7,146,556 B2
(45) Date of Patent: Dec. 5, 2006

(54) STRUCTURED DATA COMMUNICATION WITH BACKWARDS COMPATIBILITY

(75) Inventors: Terry Hardie, Union City, CA (US); Sean Connell, Richmond (CA)

(73) Assignee: Network Equipment Technologies, Inc., Fremont, CA (US)

( * ) Notice: Subject to any disclaimer, the term of this patent is extended or adjusted under 35 U.S.C. 154(b) by 388 days.

(21) Appl. No.: 10/286,336

(22) Filed: Nov. 1, 2002

(65) Prior Publication Data

US 2003/0126547 A1  Jul. 3, 2003

Related U.S. Application Data

(63) Continuation-in-part of application No. 10/161,196, filed on May 31, 2002.

(60) Provisional application No. 60/345,582, filed on Dec. 27, 2001.

(51) Int. Cl.
*H03M 13/03* (2006.01)
(52) U.S. Cl. .................. 714/786; 714/719; 714/735
(58) Field of Classification Search ............... 714/786, 714/18, 13, 48, 52, 703, 719, 735; 709/225, 709/227, 222; 370/352, 392; 700/1
See application file for complete search history.

(56) References Cited

U.S. PATENT DOCUMENTS

| | | | | |
|---|---|---|---|---|
| 3,958,226 A | * | 5/1976 | Kuroda et al. | 709/225 |
| 5,625,775 A | * | 4/1997 | Davis et al. | 709/227 |
| 5,719,761 A | * | 2/1998 | Gatti et al. | 700/1 |
| 5,745,487 A | * | 4/1998 | Hamaki | 370/352 |
| 6,427,167 B1 | * | 7/2002 | Siedel | 709/222 |
| 6,603,764 B1 | * | 8/2003 | Epley | 370/395.1 |
| 6,721,321 B1 | * | 4/2004 | Song | 370/392 |
| 6,721,805 B1 | * | 4/2004 | Bhagwat et al. | 709/250 |
| 6,876,658 B1 | * | 4/2005 | Epley | 370/395.1 |

OTHER PUBLICATIONS

"Digital Subscriber Signalling System No. 1 (DSS 1)—ISDN User-Network Interface layer 3 Specification for Basic Call Control," International Telecommunication Union (ITU), Recommendation Q.931, pp. i-317 (Malaga-Torremolinos 1984; modified in Helsinki 1993; ITU 1994).

* cited by examiner

*Primary Examiner*—Albert Decady
*Assistant Examiner*—Fritz Alphonse
(74) *Attorney, Agent, or Firm*—Townsend and Townsend and Crew LLP

(57) ABSTRACT

Methods, apparatus, and systems are presented for communicating structured data in a system utilizing devices having different data processing capabilities. The methods, apparatus, and systems involve transmitting a unit of data from a first device, wherein the unit of data comprises at least a version-specific portion and a version identifier associated with the version-specific portion, receiving the unit of data at a second device distinct from the first device, processing the version-specific portion at the second device if the second device recognizes the associated version identifier, and disregarding the version-specific portion at the second device if the second device does not recognize the associated version identifier. Disregarding the version-specific portion may comprise examining a data length field in the data unit associated with the version-specific portion to determine a length value and skipping an amount of data corresponding to the length value.

15 Claims, 5 Drawing Sheets

STRUCTURED DATA COMMUNICATION WITH BACKWARDS COMPATIBILITY

CROSS-REFERENCES TO RELATED APPLICATIONS

This application is a continuation-in-part of U.S. application Ser. No. 10/161,196 entitled "Forwarded Error Correction (FEC) for Packetized Data Networks," filed May 31, 2002. This application also claims priority to U.S. Provisional Application No. 60/345,582 entitled "Forward Error Correction (FEC) for Packetized Data Networks," filed Dec. 27, 2001. The Ser. Nos. 10/161,196 and 60/345,582 applications are assigned to Network Equipment Technologies, the assignee of the present invention, and are hereby incorporated by reference.

This application is related to U.S. application Ser. No. 09/693,782, entitled "System and Method for Frame Packing," filed Oct. 19, 2000 and to U.S. application Ser. No. 09/693,788, entitled "Forward Error Correction (FEC) for Packetized Data Networks," filed Oct. 19, 2000. The Ser. Nos. 09/693,782 and 09/693,788 applications are assigned to Network Equipment Technologies, the assignee of the present invention, and are hereby incorporated by reference.

BACKGROUND OF THE INVENTION

Traditionally, communication of data between devices has depended on the ability for such devices to operate using a common communication protocol. Backwards compatibility is a familiar problem that confronts a communication system built on any particular protocol. As a communication system evolves over time, new features often require modifications to be made to the original protocol on which the system is built. As such, newer versions of the original protocol may be introduced from time to time for use in the system. While the latest devices may be adapted to communicate using the latest version protocol, existing devices already deployed in the field may only be adapted to communicate using an older version protocol. In fact, a given system may contain an assortment of devices adapted to communicate using various older versions of a protocol.

FIG. 1 illustrates an example of communication between two devices 102 and 104 having different data processing capabilities that can lead to backwards compatibility problems. As shown, device 102 is an older piece of equipment that is adapted to generate and process an older version of a particular communication protocol. Device 104 is a newer piece of equipment that is adopted to generate and process a newer version of the communication protocol. Newer device 104 receives data 106, which conforms to the older version of the protocol, from older device 102. If newer device 104 is built to process the older version as well as the newer version of the protocol, newer device 104 will be able to process data 106. This is possible because at the time newer device 104 is built, the older version of the protocol would already be known.

In the other direction, older device 102 receives data 108, which conforms to the new version of the protocol, from newer device 104. Here, older device 102 is unlikely to be able to process the newer version of the protocol. This is because at the time older device 102 was built, the new version of the protocol would not have been known. Specifically, older device 102 may be unable to extract any useful information from data 108, because data 108 may be in a format unrecognizable to the older device 102. Worse yet, the attempt to process this unrecognizable data may affect the ability of older device 102 to process other data or otherwise cause temporary or permanent malfunctions in older device 102. Thus, backwards compatibility problems can lead to serious, even catastrophic breakdowns, if not properly addressed.

The need to preserve particular structures within a protocol, in order to retain functions and to control bandwidth overhead, further complicates the task of resolving backwards compatibility issues. For example, FIG. 2 is a bit format diagram of the general structure of a message 200 in an Integrated Services Digital Network (ISDN) protocol for digital transmission of data. This diagram illustrates certain aspects of an ISDN protocol pertinent to the present discussion and does not attempt to capture all of the details of the protocol. Message 200 may be a D-channel message containing control and signaling information that facilitate the transfer of data between at least two devices. Generally speaking, message 200 is a unit of data having a variable length and an internal structure that includes other units of data. Other messages in the protocol may have fixed lengths and/or different internal structures.

As shown, message 200 is organized as a series of bytes, or octets, of data. Message 200 includes a message type 202 in the first octet and two information elements 204 and 206 in the following octets. Message type 200 identifies message 200 as a specific message. For example, a particular binary value of "00000010" for message type 202 may indicate that message 200 is a SETUP message, in accordance with an assignment of message type values such as shown in the following table:

Message Types

| Bits | | | | | | | | |
|---|---|---|---|---|---|---|---|---|
| 8 | 7 | 6 | 5 | 4 | 3 | 2 | 1 | Definition |
| 0 | 0 | 0 | 0 | 0 | 0 | 0 | 1 | STATUS |
| 0 | 0 | 0 | 0 | 0 | 0 | 1 | 0 | SETUP |
| 0 | 0 | 0 | 0 | 0 | 0 | 1 | 1 | CONNECT |
| 0 | 0 | 0 | 0 | 0 | 1 | 0 | 0 | DISCONNECT |
| 0 | 0 | 0 | 0 | 0 | 1 | 0 | 1 | SUSPEND |
| etc. | | | | | | | | |

As a SETUP message, message 200 would pertain to the establishment, or "setup," of a communications link. In this example, information elements 204 and 206 would be two pieces of information relevant to the SETUP message. While only two information elements 204 and 206 are illustrated, a greater number of information elements may exist in message 200.

FIG. 3 is a bit format diagram of one of the information elements 204 and 206 contained in message 200. Information element 204 will be discussed here for purposes of illustration. Generally speaking, information element 204 is a unit of data having a variable length and an internal structure that includes other units of data. Other information elements in the protocol may have fixed lengths and/or different internal structures.

As shown, information element 204 includes an information element identifier 302, an information element length field 304, a type of number field 306, a numbering plan identification 308, and number digits 310. Information element identifier 302 identifies information element 204 as a particular information element. Consistent with the example of message 200 being a SETUP message, a particular binary value of "00000100" for information element identifier 302 may indicate that information element 204 is a CALLED NUMBER information element, in accordance with an assignment of information element identifier values such as shown in the following table:

| Information Element Identifiers | | | | | | | | |
|---|---|---|---|---|---|---|---|---|
| Bits | | | | | | | | |
| 8 | 7 | 6 | 5 | 4 | 3 | 2 | 1 | Definition |
| 0 | 0 | 0 | 0 | 0 | 0 | 0 | 1 | CONGESTION LEVEL |
| 0 | 0 | 0 | 0 | 0 | 0 | 1 | 0 | PROGRESS INDICATOR |
| 0 | 0 | 0 | 0 | 0 | 0 | 1 | 1 | CALLING NUMBER |
| 0 | 0 | 0 | 0 | 0 | 1 | 0 | 0 | CALLED NUMBER |
| 0 | 0 | 0 | 0 | 0 | 1 | 0 | 1 | PACKET SIZE |
| etc. | | | | | | | | |

As a CALLED NUMBER information element, information element 204 would contain information relevant to the called number, that is, the number of the party being called. Specifically, type of number field 306 is used to specify the classification of the called number as a local number, a national number, an international number, or some other type of number. Numbering plan identification 308 is used to specify the number plan of the called number as an ISDN/telephony numbering plan, Teletex numbering plan, national standard numbering plan, private numbering plan, or some other numbering plan. Number digits 310 specifies the n digits of the called number itself. Finally, information element length field 304 specifies the length of the contents of information element 204. Here, such contents would include type of number field 306, numbering plan identification 308, and number digits 310.

The structure shown in FIGS. 2 and 3 illustrate a particular ISDN protocol used for communicating data. This structure accommodates many different functions important to the implementation of a communication system. However, when such a system evolves over time and requires new functions to be created, the structure shown in FIGS. 2 and 3, in many respects, make it difficult to make desired modifications to the protocol. For instance, FIG. 3 shows that information element 204, as a CALLED NUMBER information element, has a fixed format that contains type of number 306, numbering plan identification 308, and number digits 310. As the system employing this protocol evolves, a new data field may become necessary, and the fixed format of FIG. 3 would need to be changed to accommodate the new data field. This has the potential of causing backwards compatibility problems. That is, existing device in the field adapted to processing the fixed format of FIG. 3 would be asked to handle a CALLED NUMBER information element having a structure different from that shown FIG. 3.

One alternative would be to create a new information element to handle the new data field. However, this approach has many disadvantages. First, it may be undesirable to organize the new data field in an information element other than the CALLED NUMBER information element 204. For example, it may be more efficient to process only the CALLED NUMBER information element 204 in order to access all data fields relevant to a called number (including the new data field), as opposed to processing both the CALLED NUMBER information element 204 and the new information element in order to access the same set of data fields.

Second, as shown in FIG. 3, the protocol discussed above uses a single octet (8 bits) to represent information element identifier 302. Accordingly, information element identifier 302 can take on a maximum of 2^8, or 256 possible values. As discussed above, this protocol has already assigned some of these 256 possible values to particular meanings. Once all 256 possible values have been assigned, there is no more room for identifying new information elements. It may be the case that no new information element can be created, because all possible values of information element identifier 302 have been assigned. Furthermore, it may not be feasible to expand information element identifier 302 to a size greater than one octet. Such an approach could significantly increase the bandwidth overhead of the protocol by inflating the size of a frequently transmitted data field. Similar problems would plague an approach that uses new message types to accommodate new data fields.

Protocols other than the ISDN protocol discussed above suffer similar problems. These include protocols operating on the same layer of data communication as the ISDN protocol, as well as those operating on other layers of data communication. Thus, existing communication protocols in general fail to provide a suitable arrangement that facilitates protocol modifications and properly resolves the associated problems of backwards compatibility.

BRIEF SUMMARY OF THE INVENTION

The present invention provides a new method, apparatus, and system for communicating structured data in a system utilizing devices having different data processing capabilities. The method, apparatus, and system involve transmitting a unit of data from a first device, wherein the unit of data comprises at least a version-specific portion and a version identifier associated with the version-specific portion, receiving the unit of data at a second device distinct from the first device, processing the version-specific portion at the second device if the second device recognizes the associated version identifier, and disregarding the version-specific portion at the second device if the second device does not recognize the associated version identifier.

Processing the version-specific portion may comprise reading at least one data field from a known location within the version-specific portion. Disregarding the version-specific portion may comprise examining a data length field in the data unit associated with the version-specific portion to determine a length value and skipping an amount of data corresponding to the length value. Alternatively, disregarding the version-specific portion may comprise skipping a predetermined amount of data.

In one embodiment, the version-specific portion comprises at least one data field. In another embodiment, the version-specific portion comprises at least one data element containing at least one data field. In yet another embodiment, the version-specific portion comprises at least one message containing at least one information element, the information element containing at least one data field.

DETAILED DESCRIPTION OF THE INVENTION

According to the invention, a device generates data containing one or more version-specific portions and sends the data to another device. The device receiving the data examines the data and determines whether or not to process each version-specific portion contained in the data, based on the capabilities of the device receiving the data.

Figure 1:
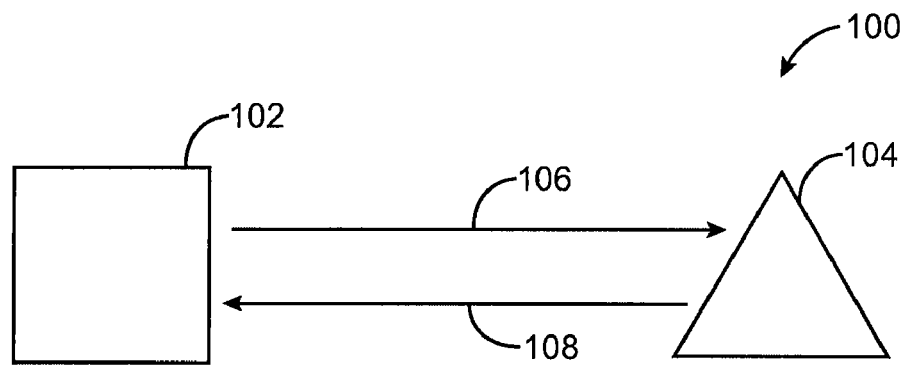
FIG. 1 illustrates an example of communication between two devices having different data processing capabilities that can lead to backwards compatibility problems.
Figure 2:
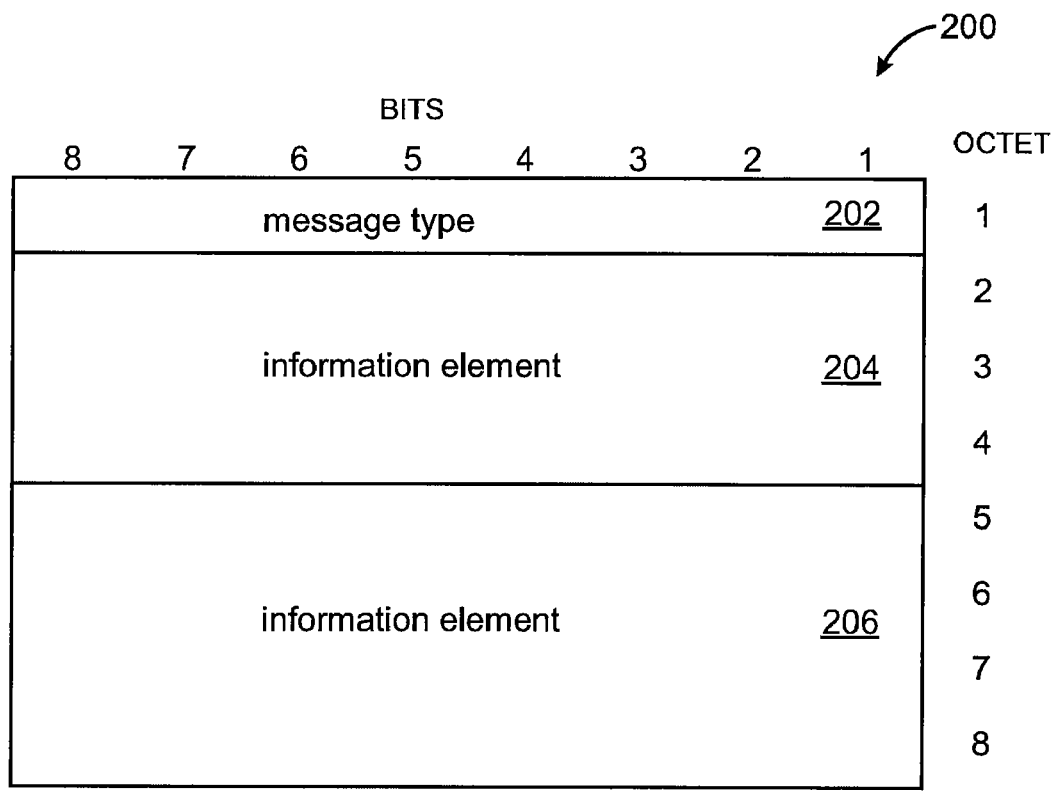
FIG. 2 is a bit format diagram of the general structure of a message in an Integrated Services Digital Network (ISDN) protocol for digital transmission of data.
Figure 3:
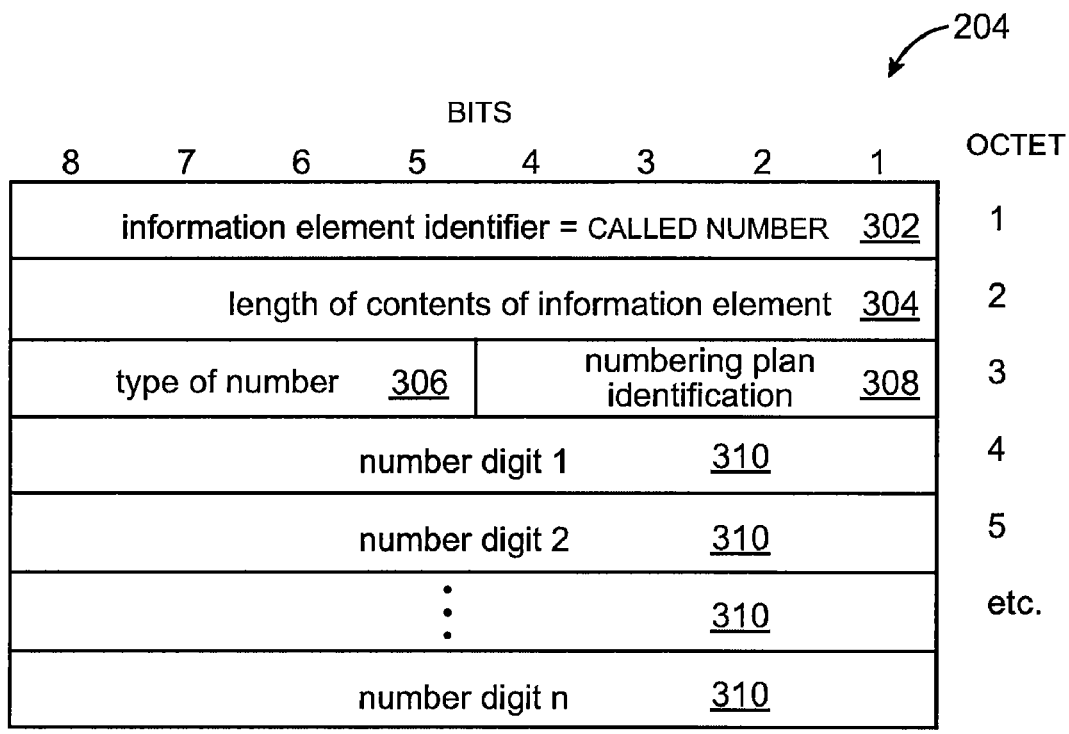
FIG. 3 is a bit format diagram of one of the information elements contained in the message shown in FIG. 2.
Figure 4:
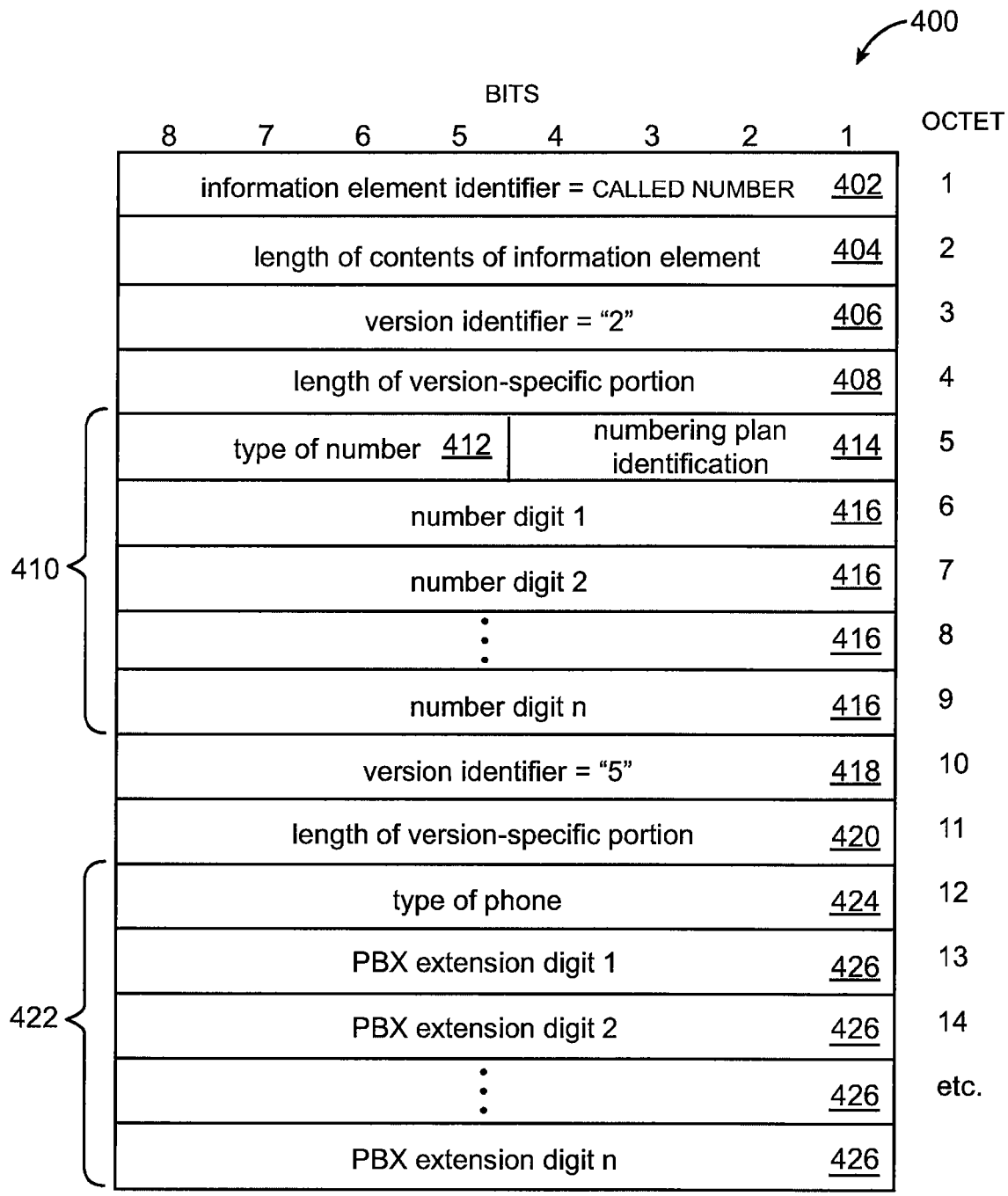
FIG. 4 is a bit format diagram of an information element containing version-specific information in accordance with a specific embodiment of the present invention.

FIG. 4 is a bit format diagram of an information element 400 containing version-specific information in accordance with a specific embodiment of the present invention. As shown, information element 400 includes an information element identifier 402 and an information element length field 404. Thus far, information element 400 resembles information element 204, which is shown in FIG. 3. That is, information element identifier 402 identifies information element 400 as a particular information element, and information element length field 404 specifies the length of the contents of information element 400. Consistent with the example of a SETUP message discussed above pertaining to FIGS. 2 and 3, a certain binary value given to information element identifier 402 may indicate that information element 400 is a CALLED NUMBER information element.

In contrast to information element 204, however, information element 400 is also shown to include a version identifier 406, a version length field 408, and a version-specific portion 410. Version identifier 406 indicates the particular version associated with version-specific portion 410. Here, version identifier 406 is shown to have a value of "2" to indicate that version-specific portion 410 conforms to version "2" of information element 400. A device receiving information element 400 would be able determine from version identifier 406 that version-specific portion 410 conforms to version "2" of information element 400. In accordance with the present embodiment of the invention, if this device is capable of handling version "2" of information element 400, the device would process version-specific portion 410. On the other hand, if the device is not capable of handling version "2" of information element 400, the device would not process version-specific portion 410.

In the case of a device deciding to not process version-specific portion 410, the device may examine version length field 408 to determine how much data must be skipped in order to reach the end of version-specific portion 410 and the beginning of the remainder of information element 400. In this manner, the device may properly disregard version-specific portion 410 and move on to process later portions of information 400, without attempting to process the contents of version-specific portion 410.

Referring again to FIG. 4, version specific portion 410 includes a type of number field 412, a numbering plan identification 414, and number digits 416. These data fields are similar to the type of number field 306, numbering plan identification 308, and number digits 310 discussed earlier with respect to information element 204 shown in FIG. 3. However, unlike information element 204, information element 400 contains these data fields in a version-specific portion 410, in accordance with the present embodiment of the invention.

Next, information element 400 is shown to include a version identifier 418, a version length field 420, and a version-specific portion 422. Here, version identifier 418 is shown to have a value of "5" to indicate that version-specific portion 422 conforms to version "5" of information element 400. In a similar manner as described above, the device receiving information element 400 would be able to determine from version identifier 418 that version-specific portion 422 conforms to version "5" of information element 400. If the device is capable of handling version "5," the device would process version-specific portion 422. If the device is not capable of handling version "5," the device would not process version-specific portion 422. Also, upon determining that it should not process version-specific portion 422, the device may examine version length field 420 to determine how to properly disregard version-specific portion 422 and move on to process later portions of information 400. As shown in FIG. 4, version specific portion 422 includes a type of phone field 424 and private branch exchange ("PBX") extension digits 426.

While version identifiers 406 and 418 are expressed as numerical values "2" and "5" in the present example, version identifiers may also be expressed using a alphabet-based value or any other type of value that allows different versions to be identified.

Furthermore, while FIG. 4 shows version-specific portion 410 (version "2") to be positioned ahead of version-specific portion 422 (version "5"), it is not required that version-specific portions be arranged in an order of ascending version number, or any particular order, within information element 400. Also, as FIG. 4 indicates, a particular version-specific portion may exist in information element 400 without the presence of other version-specific portion(s), such as those of a prior version number. For example, version-specific portion 422 (version "5") may exist in information element 400 without the presence of any version-specific portion relating to version "4," "3," "2," or "1," or any combination thereof. Thus, version-specific portion 422 (version "5") may be the sole version-specific portion present in information element 400. A device receiving information element 400 would simply process each version-specific portion in information element 400, independently of other version-specific portions, in the manner set forth above.

Such independent examination of distinct version-specific portions allows devices having different data processing capabilities to co-exist using a common data communication structure. For example, a particular device receiving information element 400 may process both version-specific portions 410 and 422, if the device is capable of handling both versions "2" and "5." By contrast, another device receiving information element 400 may process only version-specific portion 410, but not version-specific portion 422, if the device is capable of handling version "2," but not version "5."

Furthermore, this arrangement allows data fields to be added to information element 400 while maintaining a logical and efficient structure. For instance, type of phone field 424 and private branch exchange ("PBX") extension digits 426 are data fields that logically relate to information element 400 as a CALLED NUMBER information element. By placing these data fields in a version-specific portion within CALLED NUMBER information element 400, the need for creating a new information element to accommodate these data fields is eliminated. Thus, the present invention allows logically related data fields to remain in the same information element, thereby promoting processing efficiency This also obviates other difficulties associated with the creation of new information elements, such as the need to assign additional information element identifier values and the associated issue of running out of assignable information element identifier values.

A first device communicating with a second device may send a query to the second device to determine whether the second device is capable of implementing a particular feature. For example, if the first device is capable of sending forward error correction ("FEC") encoded data, the first device may send a query asking the second device whether it can receive and decode FEC encoded data. This query may be sent using a new data field, such as those discussed previously contained in a version-specific portion. If FEC encoding is not a feature implemented in the second device, the second device may indicate so by sending a response message to the first device. Alternatively, if the second device does not respond (because it does not process the version-specific version containing the new data field relating to the query, for example), the first device may conclude that the FEC encoding feature is not implemented in the second device. Thus, the first device would be able to decide to not send FEC encoded data to the second device. Such procedures may be employed to determine whether other features are implemented in a particular device.

Figure 5:
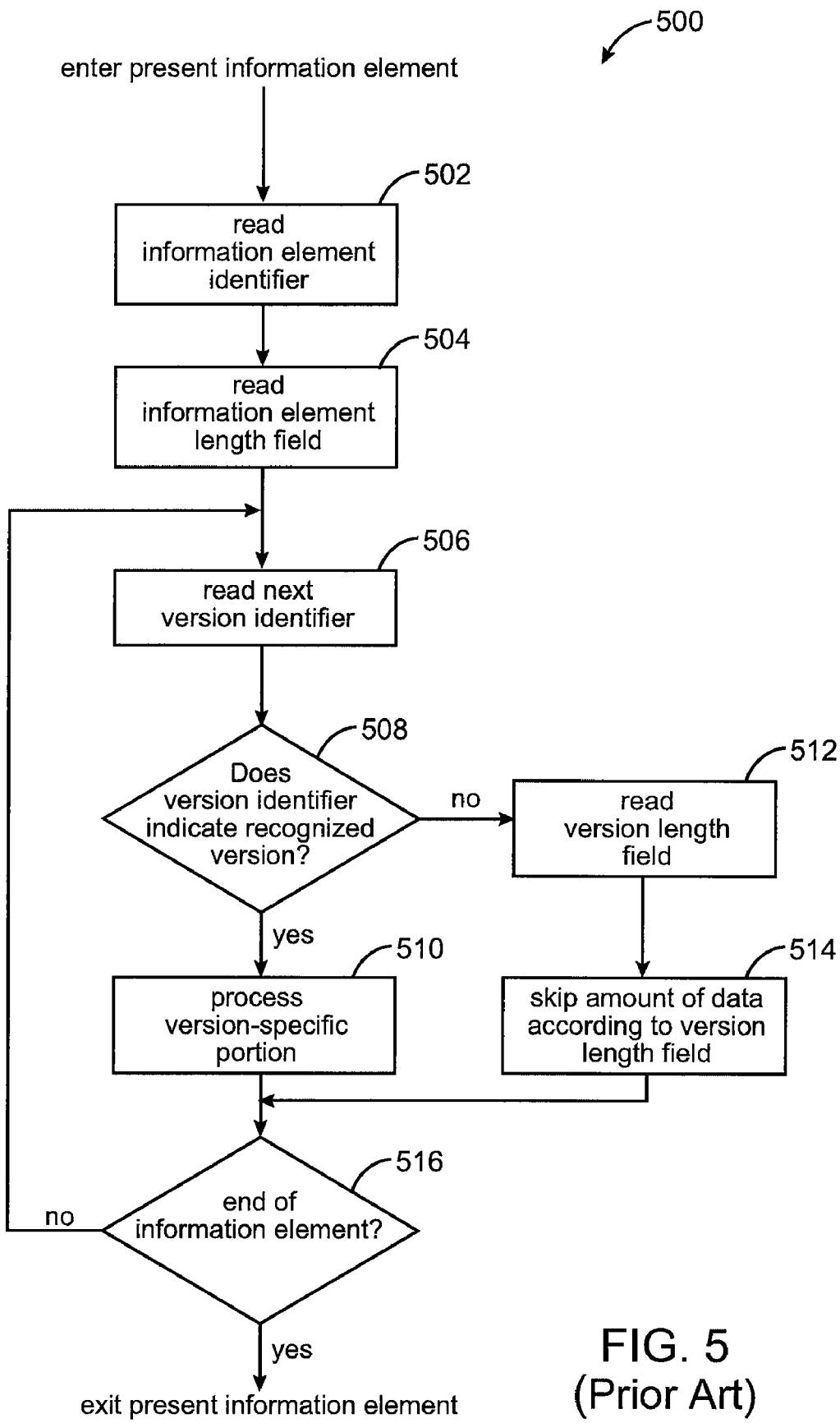
FIG. 5 is a flow chart generally outlining the steps taken by a device processing the information element shown in FIG. 4.

FIG. 5 is a flow chart 500 generally outlining the steps taken by a device processing an information element such as information element 400. Upon entering the information element, in a step 502, the device reads the information element identifier. Next, in a step 504, the device reads the information element length field. Generally, the information element length field would indicate the length of the rest of the information element, in terms of bytes. However, a different way of indicating the length of the contents of the information element may be employed.

Then, in a step 506, the device reads the next version identifier, that is, the version identifier that can next be read from the information element. Thereafter, the device determines in a step 508 whether it recognizes the version indicated by the version identifier. In other words, the device asks whether it is capable of processing data in an associated version-specific portion conforming to the particular version indicated by the version identifier. If the answer to step 508 is yes, the device performs a step 510, in which the device processes the associated version-specific portion. If the answer to step 508 is no, the device performs a step 512, in which the device reads the version length field associated with the version-specific portion. Following step 512, the device performs a step 514, in which the device skips an amount of data according to the version length field. That is, by examining the version length field, the device can determine exactly how much data to disregard in order to reach the end of the version-specific portion. Alternatively, the device may skip a predetermined amount of data. Thus, upon determining that it is unable to process this particular version-specific portion, the device skips over the version-specific portion without attempting to process its contents.

After performing either step 510 or step 514, the device performs step 516. In this step, the device determines whether it has reached the end of the information element. The device may be able to make this determination by comparing the amount of data that it has processed since performing step 504 with the value of the information element length field, which was read in step 504. If the answer to step 516 is no, the device loops back to perform step 506. For an information element that contains more than one version-specific portion, the device will loop back in this manner to step 506 until all of the version-specific portions of the information element have been either processed or skipped. If the answer to step 516 is yes, the device exits the present information element.

Figure 6:
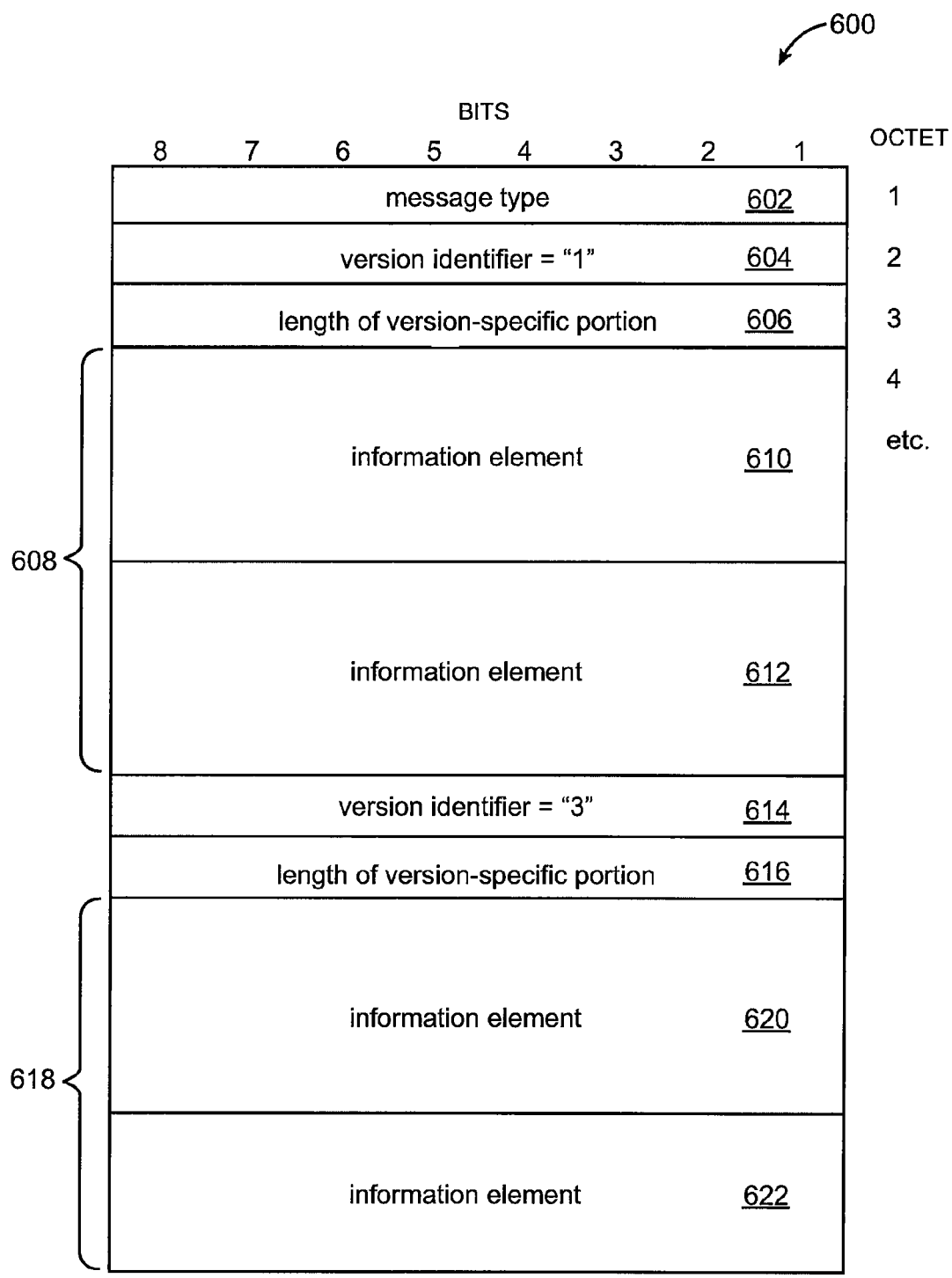
FIG. 6 is a bit format diagram of the general structure of a message 600 containing version-specific information comprising individual information elements, in accordance with another embodiment of the present invention.

FIG. 6 illustrates another embodiment of the present invention. FIG. 6 is a bit format diagram of the general structure of a message 600 containing version-specific information comprising individual information elements. That is, the structure of a version identifier, a version length field, and a version-specific portion, are employed at a different level within the communication protocol than previously discussed. Message 600 includes a message type 602, a version identifier 604, a version length field 606, and a version-specific portion 608. Version-specific version portion 608 includes information elements 610 and 612. In this example, version-specific portion 608 is not located within an information element. Rather, version-specific portion 608 is shown to contain a number of information elements.

In a similar fashion, message 600 further includes a version identifier 614, a version length field 616, and a version-specific portion 618. Version-specific portion 618 includes information elements 620 and 622. Message 600 may include additional version identifiers, version length fields, and version-specific portions. Each information element may have its own structure, as discussed previously.

In yet another embodiment, a version-specific portion may comprise one or more messages, such as message 600. Thus, in accordance with the invention, version-specific portions may be employed at various levels within a given protocol. Further, version-specific portions may be used in different protocols and at different layers of an overall communication scheme. For example, version-specific portions may be used at different layers of an Open Systems Interconnection ("OSI") communication scheme.

Although the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims. For example, while the different scanning patterns mentioned above have been illustrated as two-dimensional embodiments, they can also be extended to three-dimensional patterns in accordance with the present invention.

What is claimed is:

1. A method for communicating structured data in a system utilizing devices having different data processing capabilities comprising:

transmitting a unit of data from a first device, said unit of data comprising at least a version-specific portion and a version identifier associated with said version-specific portion;

receiving said unit of data at a second device distinct from said first device;

processing said version-specific portion at said second device if said second device recognizes said associated version identifier; and disregarding said version-specific portion at said second device if said second device does not recognize said associated version identifier.

2. The method of claim 1, wherein said step for processing said version-specific portion comprises reading at least one data field from a known location within said version-specific portion.

3. The method of claim 1, wherein said version-specific portion comprises at least one data field.

4. The method of claim 1, wherein said version-specific portion comprises at least one data element containing at least one data field.

5. The method of claim 1, wherein said version-specific portion comprises at least one message containing at least one information element, said information element containing at least one data field.

6. A method for communicating structured data in a system utilizing devices having different data processing capabilities comprising:

transmitting a unit of data from a first device, said unit of data comprising at least a version-specific portion and a version identifier associated with said version-specific portion;

receiving said unit of data at a second device distinct from said first device;

processing said version-specific portion at said second device if said second device recognizes said associated version identifier; and disregarding said version-specific portion at said second device if said second device does not recognize said associated version identifier, wherein said step for disregarding said version-specific portion comprises examining a data length field in said data unit associated with said version-specific portion to determine a length value and skipping an amount of data corresponding to said length value.

7. A method for communicating structured data in a system utilizing devices having different data processing capabilities comprising:

transmitting a unit of data from a first device, said unit of data comprising at least a version-specific portion and a version identifier associated with said version-specific portion;

receiving said unit of data at a second device distinct from said first device;

processing said version-specific portion at said second device if said second device recognizes said associated version identifier; and disregarding said version-specific portion at said second device if said second device does not recognize said associated-version identifier, wherein said step for disregarding said version-specific portion comprises skipping a predetermined amount of data.

8. A system for communicating structured data utilizing devices having different data processing capabilities comprising:

a first device adapted to send a unit of data comprising at least a version-specific portion and a version identifier associated with said version-specific portion; and a second device distinct from said first device and adapted to receive said unit of data, said second device further adapted to process said version-specific portion if said second device recognizes said associated version identifier or disregard said version-specific portion if said second device does not recognize said associated version identifier.

9. The system of claim 8, wherein said second device is adapted to process said version-specific portion by reading at least one data field from a known location within said version-specific portion.

10. The system of claim 8, wherein said version-specific portion comprises at least one data field.

11. The system of claim 8, wherein said version-specific portion comprises at least one data element containing at least one data field.

12. The system of claim 8, wherein said version-specific portion comprises at least one message containing at least one information element, said information element containing at least one data field.

13. A system for communicating structured data utilizing devices having different data processing capabilities comprising:

a first device adapted to send a unit of data comprising at least a version-specific portion and a version identifier associated with said version-specific portion; and a second device distinct from said first device and adapted to receive said unit of data, said second device further adapted to process said version-specific portion if said second device recognizes said associated version identifier or disregard said version-specific portion if said second device does not recognize said associated version identifier, wherein said second device is adapted to disregard said version-specific portion by examining a data length field in said data unit associated with said version-specific portion to determine a length value and skipping an amount of data corresponding to said length value.

14. A system for communicating structured data utilizing devices having different data processing capabilities comprising:

a first device adapted to send a unit of data comprising at least a version-specific portion and a version identifier associated with said version-specific portion; and a second device distinct from said first device and adapted to receive said unit of data, said second device further adapted to process said version-specific portion if said second device recognizes said associated version identifier or disregard said version-specific portion if said second device does not recognize said associated version identifier, wherein said second device is adapted to disregard said version-specific portion by skipping a predetermined amount of data.

15. A system for communicating structured data in a system utilizing devices having different data processing capabilities comprising:

means for transmitting a unit of data from a first device, said unit of data comprising at least a version-specific portion and a version identifier associated with said version-specific portion;

means for receiving said unit of data at a second device distinct from said first device;

means for processing said version-specific portion at said second device if said second device recognizes said associated version identifier; and means for disregarding said version-specific portion at said second device if said second device does not recognize said associated version identifier.

* * * * *